No. 853,870. PATENTED MAY 14, 1907.
G. C. ELLERTON.
DISTRIBUTING APPARATUS.
APPLICATION FILED NOV. 24, 1906.

5 SHEETS—SHEET 1.

No. 853,870. PATENTED MAY 14, 1907.
G. C. ELLERTON.
DISTRIBUTING APPARATUS.
APPLICATION FILED NOV. 24, 1906.

5 SHEETS—SHEET 2.

No. 853,870. PATENTED MAY 14, 1907.
G. C. ELLERTON.
DISTRIBUTING APPARATUS.
APPLICATION FILED NOV. 24, 1906.

5 SHEETS—SHEET 3.

Witnesses
Inventor
George C. Ellerton
By Wilkinson & Fisher
Attorneys

No. 853,870. PATENTED MAY 14, 1907.
G. C. ELLERTON.
DISTRIBUTING APPARATUS.
APPLICATION FILED NOV. 24, 1906.
5 SHEETS—SHEET 4.
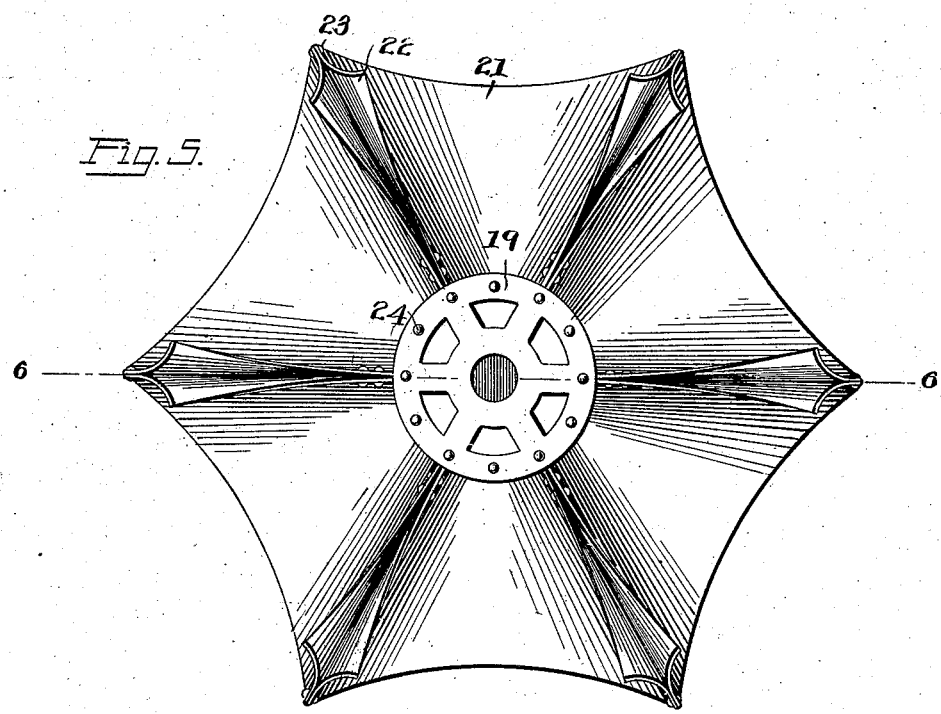
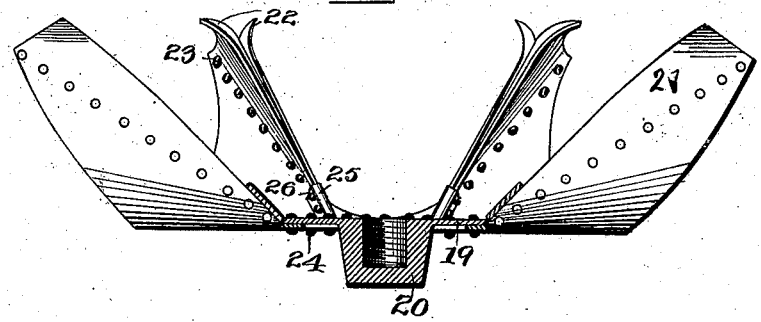
Witnesses
Inventor
George C. Ellerton,
By Wilkinson & Fisher
Attorneys

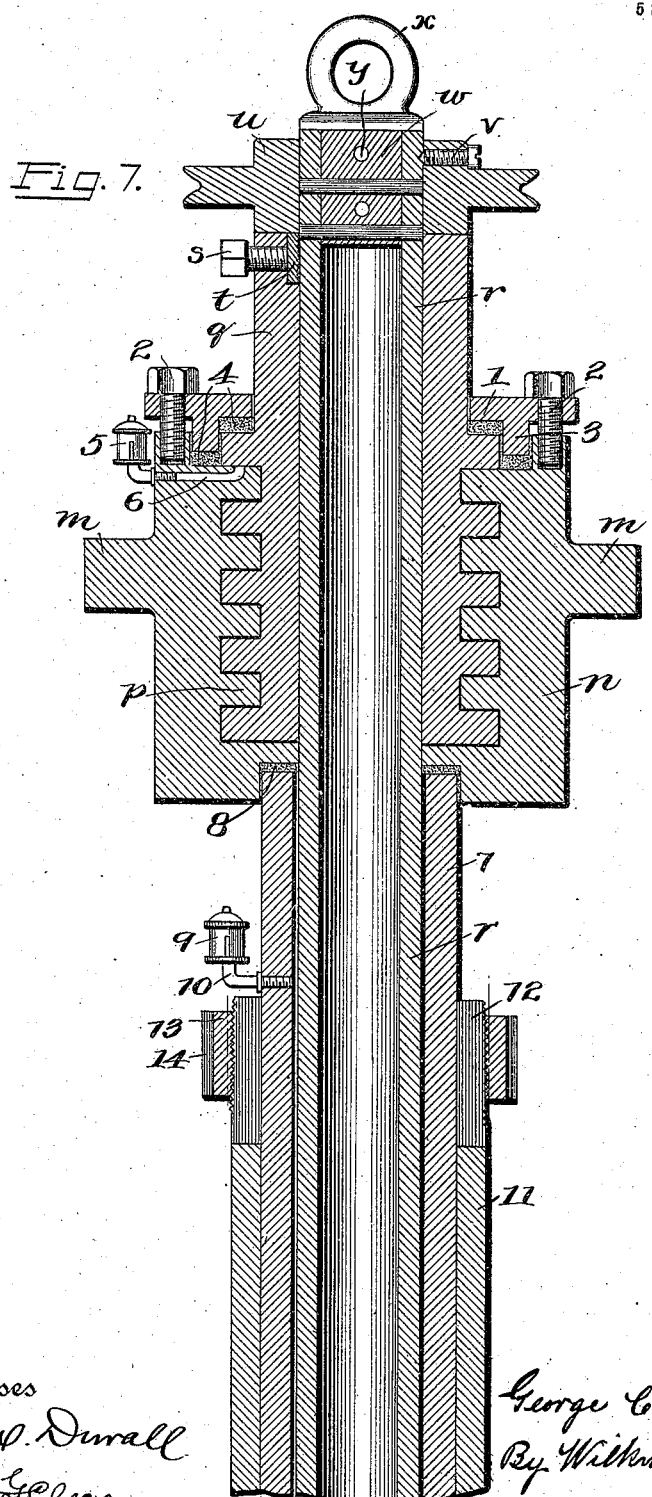

UNITED STATES PATENT OFFICE.

GEORGE C. ELLERTON, OF THE UNITED STATES NAVY.

DISTRIBUTING APPARATUS.

No. 853,870.   Specification of Letters Patent.   Patented May 14, 1907.

Application filed November 24, 1906. Serial No. 344,976.

*To all whom it may concern:*

Be it known that I, GEORGE C. ELLERTON, a citizen of the United States, and a warrant machinist in the United States Navy, serving on board United States steamship *Iowa*, have invented certain new and useful Improvements in Distributing Apparatus; and I do hereby declare the following to be a full, clear, and exact description of the invention, such as will enable others skilled in the art to which it appertains to make and use the same.

My invention relates to improvements in distributing apparatus, and is especially designed to distribute coal, grain, or similar articles loosely in the hold of a ship, although it is not restricted to such uses. It is particularly advantageous in case of stowing grain and coal in bulk in the hold of the ship, as it lessens the expense of loading the vessel, and avoids the danger involved in stowing away the load by hand.

With this object in view, my invention consists in the construction and combinations of parts, as hereinafter described and claimed.

Figure 1:
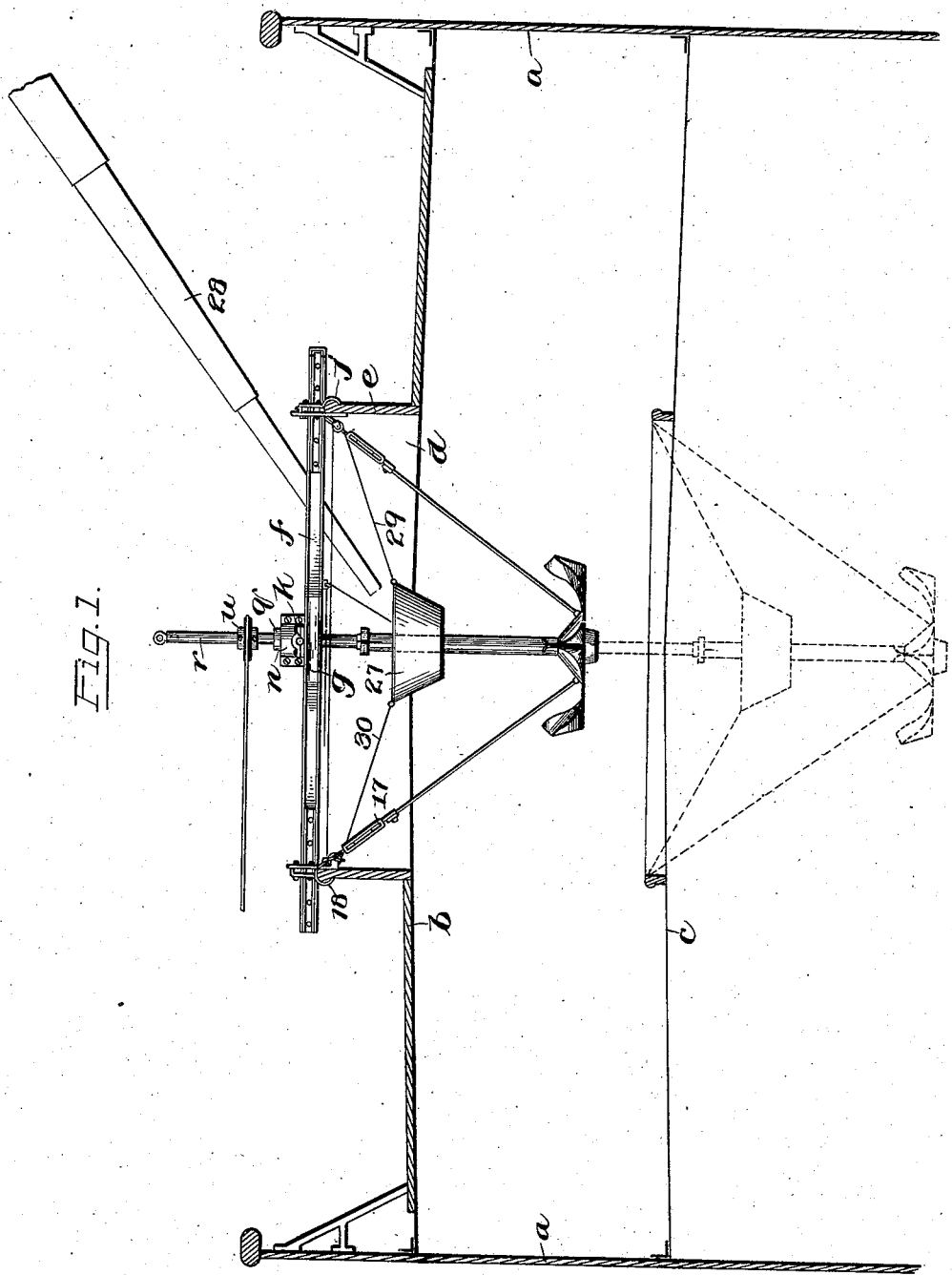
Figure 2:
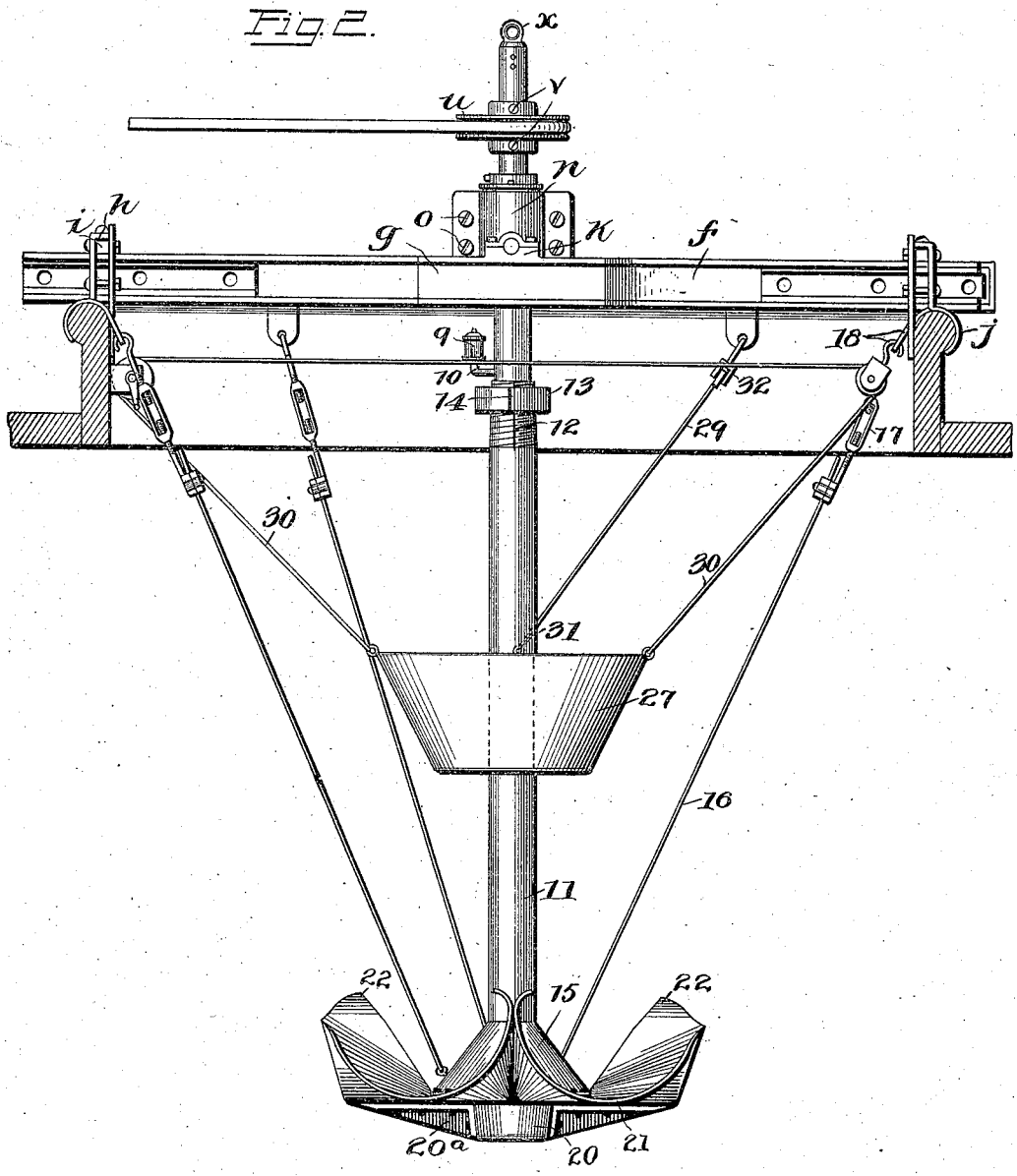
Figure 3:
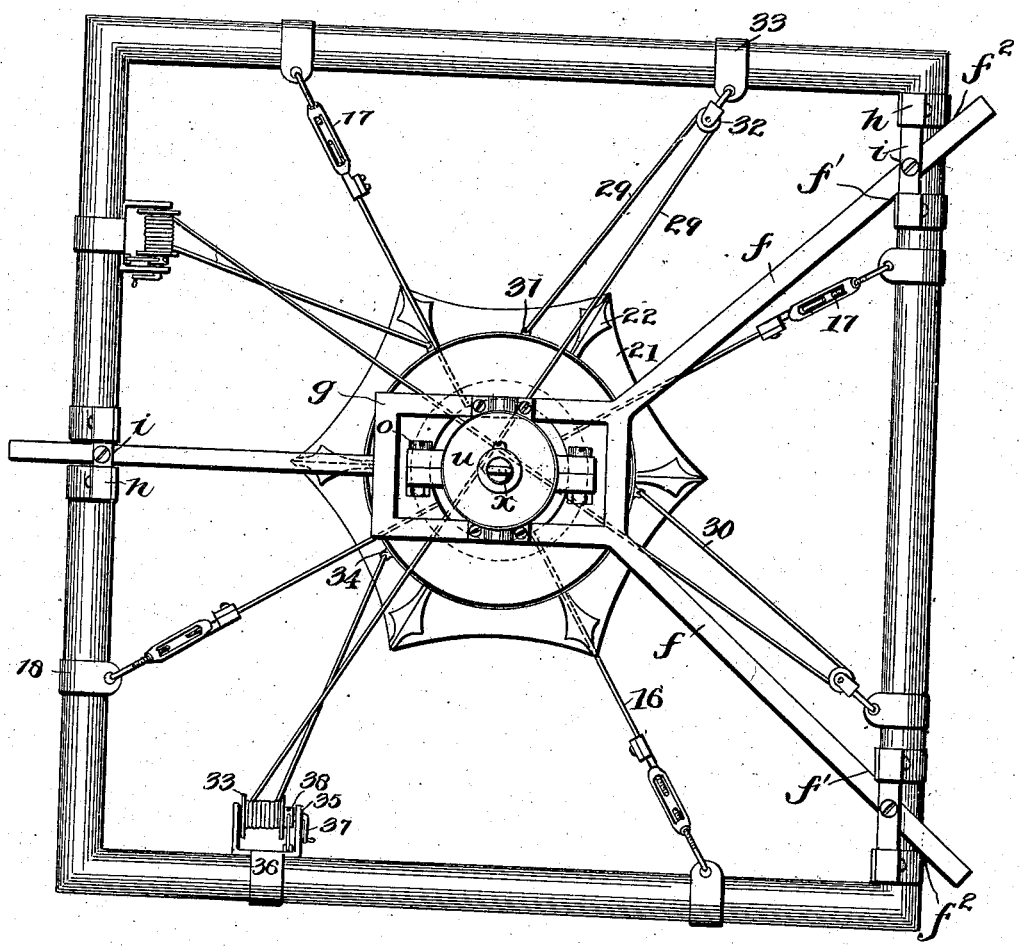
Figure 4:

In the accompanying drawings; Figure 1 is a section through a vessel taken through two decks and showing my improvement applied to the hatch of the upper deck, and also indicating in dotted lines my improvement applied to the hatch of the lower deck. Fig. 2 is a side elevation, on a larger scale, of my improved apparatus showing it resting upon the hatch coaming. Fig. 3 is a top plan view showing my invention resting on and supported by the hatch coaming. Fig. 4 is a detail view showing the turn buckle device. Fig. 5 is a top plan view of the revolving distributer detached. Fig. 6 is a vertical section on line 6—6 of Fig. 5. Fig. 7 is a central vertical section, on an enlarged scale, of the driving shaft and connected parts. Fig. 8 is a sectional detail showing connection between distributing cone and telescoping tube.

$a$ represents the sides of a vessel, $b$ the upper deck, and $c$ the lower deck thereof. The upper deck is provided with a hatch $d$ having a coaming $e$ on which my improved apparatus is adapted to be supported, as shown in Figs. 1 and 2.

The apparatus is supported on the hatch coaming by means of a three-armed frame, the three arms $f$ of which are joined to a central rectangular portion $g$. To each of the three arms $f$ a movable clamp $h$ is attached by means of the set screw $i$. By the arrangement described, the frame is adapted to fit hatch coamings of different sizes. The clamp $h$ is adapted to fit over the hatch coaming $e$, as shown at $j$, in Fig. 1, and is of any desired type.

Centrally of the two longer sides of the rectangular portion $g$ of the supporting frame are arranged bearings $k$ adapted to receive the trunnions $m$ of the thrust saddle $n$. This is made in two parts, as shown in Fig. 2, said parts being united by the screws or bolts $o$. It is provided with a series of projections $p$ which engage corresponding depressions in the thrust sleeve $q$.

$r$ represents the driving shaft, shown in Fig. 7 as hollow, although, of course, it may be solid, if desired. The thrust sleeve $q$ is attached to the shaft $r$ by means of a bolt $s$, and binding block $t$. A driving pulley $u$ is adjustably attached by means of the screws $v$ to the shaft $r$ above the thrust sleeve.

$w$ represents a plug provided with an eye bolt $x$, which is fastened by means of pins $y$ into the upper part of the hollow shaft $r$. This is for the purpose of raising or lowering the entire apparatus, when desired, by means of suitable tackle.

To keep the thrust saddle and the thrust sleeve in their proper relative positions I use an annular disk 1 attached by means of bolts 2 to the top of the thrust saddle $n$. This disk is provided with a downwardly projecting circular flange 3, which fits in a recess in the top of the thrust saddle $n$. Between the disk or collar 1 and the thrust saddle is a soft packing made of any desired material, which makes the thrust bearing dust proof.

5 represents an oil cup connected by means of a passage 6 to the junction of the thrust sleeve and thrust saddle to lubricate said junction.

The lower end of the thrust saddle $n$ is provided with a circular recess into which projects the upper end of a stationary pipe 7, which surrounds the shaft $r$. Between the upper end of this pipe and the thrust saddle is a packing 8 of absorbent material to keep out dust.

9 represents an oil cup which, by means of a pipe 10, supplies oil between the bearing in lower end of the pipe 7 and shaft $r$.

Outside of the pipe 7 is a pipe 11, telescoping on the pipe 7 and arranged to be fastened in any desired position thereon. The upper part of the pipe 11 is split, as shown at 12, and screw threaded, and a nut 13 having spanner grooves 14 thereon is adapted to engage the threads on the upper part of the pipe 11. By loosening the nut 13, the pipe 11 may be slid downward on the pipe 7 from the position shown in Fig. 7, the set screws $v$ and $s$ having been loosened and the shaft $r$ lowered, and by means of the nut 13, the pipes 11 and 7 may be securely clamped together again in any desired position, so that this binding connection between the pipes 11 and 7 will tend to support the weight of the telescoping pipe 11 independently of the stay rods 16 hereinafter referred to.

The lower end of the pipe 11 suspends a deflecting member illustrated in the drawings as a hollow truncated cone 15, which cone is connected to rods or wires 16, each provided with an adjustable turn buckle 17 suspended by clips 18 to fit over the hatch coaming. This deflecting member or distributing cone may be secured to the pipe 11 in any suitable way, but as shown in Fig. 8, I prefer to have the lower end of the pipe project downwardly through the cone, the upper end of the cone being securely riveted or otherwise affixed thereto, and the lower end of the pipe 11 being provided with the enlarged inwardly projecting portion $11^a$, preferably of Babbitt metal, to form a bearing for the revoluble shaft $r$. A dust proof gland may be provided at the lower end of the pipe 11.

On the lower end of the revoluble shaft $r$ is mounted the distributer device shown in Figs. 2, 5 and 6. This consists of a central portion 19 made like a wheel and having a downwardly projecting hub 20 provided with an interior screw thread with which the lower screw threaded end of the shaft $r$ is adapted to engage. To this wheel 19 are attached the distributer plates 21 of the peculiar form shown in Figs. 2, 5 and 6, that is to say approximately curved into the form of a semicircle in cross section, but flaring outwardly from the central wheel, as shown in Fig. 5, and having their upper edges 22 diverging from each other.

The adjacent distributer plates are secured together by means of rivets 23 and are secured to the wheel 19 by means of rivets 24. The edges 22 at their outer ends diverge from each other a considerable distance to throw the material under treatment out from the center, and this particular shape of the distributer plates I regard as of considerable importance.

The inner parts of the edges 22 come closer together, as best shown in Fig. 5, and to prevent the material which falls down upon the cone 15, from getting in between, and from battering the inner part of the edges 22 of the distributer plates, I provide clips 25, Fig. 6, which are bent over the meeting line of the lower part of said edges and fastened by means of rivets 26.

The horizontal webs of the distributer plates 21 may have a reinforced support, as shown in Fig. 2, wherein $20^a$ designates angle plates suitably secured to the horizontal webs and the hub 20 as by rivets or bolts.

Some little distance above the cone 15, and surrounding the tube 11, is a hopper 27, conical in shape, with its larger end upward and open at the top and bottom. Into this hopper the ordinary telescopic pipe 28 delivers the grain or other material to be stowed away. This hopper is arranged at some little distance from the tube 11, and is supported by means of two ropes 29 and 30. The lower end of the cord 29, for example, is attached to an eye 31 in the hopper 28, and passes up over a pulley 32 supported in a clip 33 adapted to be supported on the hatch coaming. The cord 29 thence passes over a pulley 33, around which it is wrapped several times, and downward to an eye 34 on the hopper 27. The pulley 33 is mounted in a bracket 35 provided with a clip 36, which is adapted to engage the hatch coaming, and this pulley is provided with a handle 37 and a ratchet and pawl arrangement 38. The cord 30 is connected to the hopper 27 in precisely the same way, and those cords are arranged nearly at right angles to each other.

In operation it will be observed that the whole device is swung into position over the hold by means of a crane suspending apparatus by the eyelet $x$, and when lowered into the hold the arms $f$ of the frame rest on the hatch coaming, and the attendants looking out for the stay rods, tackle, etc may now affix the clips in position on the hatch coaming and clamp the frame down by means of the clamping members $h$ securely to the coaming. At the same time, should the vessel be in a listed position, it will be observed that by means of the trunnion connection between the thrust saddle and the frame, there is no undue lateral strain on the frame, as would otherwise be the case when the frame rests in position over the hatch.

In actual operation, it will be observed that the thrust saddle $n$, the pipes 7 and 11, and the deflecting member 15 are stationary, while the shaft $r$, thrust sleeve $q$ and the distributing device revolve.

The parts being in their working positions and suitably stayed up, upon imparting motion to the shaft $r$ through any suitable driving means, such as the pulley $u$, the materialing device is rapidly rotated and the coal or other article being loaded discharging through the chute 28 (Fig. 1) into the hopper 27, is directed downwardly in a substantially vertical direction on to the deflecting member or cone 15, which deflects same off laterally on to the curved revolving blades 22 of the distributing device, in such a manner that the strain or shock is lessened on the latter, owing to the fact that the material has already had imparted thereto, by the deflection of the cone 15, a motion taken up by the revolving blades, which throw the material upwardly and outwardly into the spaces in the hold to be filled. The deflecting cone 15 also serves another useful purpose in connection with the adjustable hopper 27. It is understood that when the material is discharged on to the cone 15 and to the distributing device, it is carried a certain distance around by the distributing device, before it is centrifugally discharged therefrom, so that by regulating the fall of material on the cone 15, the position of discharge from the distributing device, with reference to the hold being filled, may be regulated. This is desirable as frequently one section of the hold may be filled and a big space left in another part near the top thereof. To accomplish this desired end, it will be observed that by operating the drums 33, the position of the hopper 27 may be shifted laterally above the cone, so that the position of discharge on the latter can be regulated, and hence the position of delivery to the distributing device and the position of discharge therefrom.

Again, where it is desired to elevate the device, for instance from the position shown in dotted lines in Fig. 1 to the position shown in full lines, upon releasing set screws $v$ and $s$ and upon releasing the nut 13, by means of a cable connected to the eyelet $x$ and a suitable crane, the rod $r$ may be elevated carrying with it the distributing device and the cone 15 resting thereon, the pipe 11 telescoping on the pipe 7. When the parts have reached their elevated position, the set screws $v$ and $s$ and the nut 13 may be tightened up again and the stay rods 16 and cables 29 and 30 readjusted to suit the changed conditions.

From the foregoing, it will be observed that by the construction and manner of mounting my improved apparatus, a number of advantageous features are accomplished, among them being that the weight of the device when in operation is taken up by the stays 16 and is not on the center of the frame as in constructions heretofore; also the installation of the apparatus is always done from the outside, absolutely avoiding any necessity of an attendant going into the hold; also the apparatus may be readily adjusted in a vertical direction as well as having means for controlling the discharge of the material into any portion of the hold; also by virtue of the trunnion bearings there is no lateral strain on the frame, in case the vessel should be listed, while the stay rods are being fastened in position.

It may also be noted, referring to Fig. 3, that when the side members of the clamp $h$ are close together, in addition to the frame arms $f$ being held by the set screw $i$, the frame is additionally prevented from slipping by the inner edges of the diverging arms coming into engagement with the inside clamp members, as at $f'$ should the frame tend to move to the right in Fig. 3, and the outside edges of the arms would bind against the outside members of the clamp, as at $f^2$, should the frame tend to move to the left.

While for the purpose of disclosure, I have described a construction illustrated in the drawings as a practical embodiment of my invention, still I wish it to be understood that I do not limit myself to the exact details thereof, but

What I claim is:—

1. In a distributing apparatus, the combination of a supporting frame, a rotatable shaft pivotally mounted on said frame, and a distributing device carried by said shaft, substantially as described.

2. In a distributing apparatus, the combination of a supporting frame, a rotatable shaft pivotally mounted on said frame, a distributing device carried by said shaft, and a hopper mounted above said distributing device, substantially as described.

3. In a distributing apparatus, the combination of a supporting frame, a rotatable shaft pivotally mounted in said frame and carrying a distributing device on its lower end, and an open ended hopper surrounding said shaft and adjustable relatively thereto, substantially as described.

4. In a distributing apparatus, the combination of a supporting frame, a shaft mounted in said frame and carrying a distributing device at its lower end, an open ended hopper surrounding said shaft, and means for adjusting said hopper in relation to said shaft, substantially as described.

5. In a distributing apparatus, the combination of a supporting frame, a rotatable shaft pivotally mounted in said frame, a distributing device carried on the lower end of said shaft, and means located above said distributing device for throwing the material under treatment, as it falls, outwardly into said distributing device, substantially as described.

6. In a distributing apparatus, the combination of a supporting frame, a rotatable shaft pivotally mounted in said frame, means for adjusting said shaft up and down relatively to said frame, a distributing device carried by the lower end of said shaft, telescoping pipes surrounding said shaft, and a distributing cone supported at the lower end of said telescoping pipes, substantially as described.

7. In a distributing apparatus, the combination of a supporting frame, a rotatable shaft pivotally mounted in said frame, means for adjusting said shaft relatively to said frame, a distributing device carried by the lower end of said shaft, telescoping pipes surrounding said shaft, means for securing said pipes in different positions relatively to each other, a cone located at the lower end of said telescoping pipes, and means for adjustably supporting said cone, substantially as described.

8. In a distributing apparatus, the combination of a rotatable shaft, and a distributing device adapted to be secured to one end of said shaft and including a central support, and curved plates, said plates flaring outward from said central support and having their edges bent upward, the upper edges being separated from each other, substantially as described.

9. In a distributing apparatus, the combination of a rotatable shaft and a distributing device adapted to be secured thereto, said distributing device consisting of a supporting wheel with a screw threaded hub, a series of curved plates attached to said wheel, said plates flaring outwardly from said wheel and having their edges bent up with the upper parts of said edges diverging from each other, and each of said plates being secured to the two adjacent plates, substantially as described.

10. In a distributing apparatus, the combination of a rotatable shaft and a distributing device adapted to be carried thereby, said distributing device consisting of a wheel provided with a screw threaded hub, a series of distributing plates bolted to said wheel, said plates flaring outwardly from said wheel and being bent upwardly having their upper edges separated from each other, but secured together, and protecting clips secured over the lower part of the meeting line of said edges, substantially as described.

11. In a distributing apparatus, the combination of a supporting frame, a rotatable shaft mounted in said frame and carrying a distributing device at its lower end, a hopper open at both ends surrounding said shaft, and means for adjusting said hopper relatively to said shaft, consisting of sustaining cords running over guide pulleys and adjusting pulleys, substantially as described.

12. In a distributing apparatus, the combination of a supporting frame, a rotatable shaft mounted in said frame and carrying a distributing device at its lower end, an open ended hopper surrounding said shaft, and means for adjustably supporting said hopper consisting of cords each attached at both ends of said hopper, and running over guide pulleys and adjusting pulleys, and means for securing said adjusting pulleys in any desired position, substantially as described.

13. In a distributing apparatus, the combination of a supporting frame, means for attaching it to a hatch coaming, a rotatable shaft pivotally mounted in said frame, a distributing device carried by the lower end of said shaft, means for adjusting said shaft relatively to said frame, an open ended hopper surrounding said shaft, means for adjusting said hopper, telescoping pipes surrounding said shaft and located within said hopper, a distributing cone located at the lower end of said pipes, and adjustable means for supporting said cone, substantially as described.

14. In a distributing apparatus, the combination of a rotatable hollow shaft, an eye bolt secured in the upper end of said shaft, a pulley adjustably secured to said shaft, a distributing device carried by the lower end of said shaft, a supporting frame provided with bearings, and means for pivotally supporting said shaft in said bearings, substantially as described.

15. In a distributing apparatus, the combination of a supporting frame composed of a central portion and arms projecting therefrom, bearings on said central portion, a thrust saddle pivoted in said bearings, and a shaft adjustably mounted in said thrust saddle and carrying a distributing device at its lower end, substantially as described.

16. In a distributing device, the combination of a supporting frame comprising a central portion and projecting arms, bearings on said frame, a thrust saddle pivotally mounted on said bearings, a rotatable shaft in said thrust saddle and carrying a distributing device at its lower end, a thrust sleeve located between said thrust saddle and said shaft, and means for locking said shaft in said sleeve, substantially as described.

17. In a distributing apparatus, the combination of a supporting frame, comprising a central rectangular portion and arms projecting therefrom, bearings mounted on said frame, a thrust saddle pivotally mounted in said bearings, a thrust sleeve engaging said thrust saddle, a rotatable shaft adjustably secured to said thrust sleeve, a driving pulley adjustably secured to said shaft, and a distributing device carried on the lower end of said shaft, substantially as described.

18. In a distributing apparatus, the combination of a supporting frame, a rotatable shaft carried by said frame, a distributing device carried by the lower end of said rotatable shaft and rotating therewith, a deflecting member located above said distributing device for laterally directing the material under treatment to said distributing device, said deflecting member being stationary with reference to said rotating distributing device, and means regulating the position of delivery to said deflecting member substantially as described.

19. In a distributing apparatus, the combination of a supporting frame, a vertically adjustable rotatable shaft, means for pivotally supporting said shaft on said frame, and means for rotating said shaft, substantially as described.

20. In a distributing apparatus, the combination of a supporting frame, a rotatable shaft mounted thereon, means for rotating said shaft, a distributing device carried at the lower end of said shaft, an adjustable pipe encircling said shaft, means for holding said adjustable pipe rigid when in its various adjusted positions, and a deflecting member carried at the lower end of said adjustable pipe, said adjustable pipe being also provided at its lower end with an internal bearing for the lower end of said rotatable shaft, substantially as described.

21. In a distributing apparatus, the combination of a supporting frame, a vertically adjustable rotatable shaft pivotally suspended therefrom, means for rotating said shaft, a distributing device carried at the lower end of said shaft, a pipe rigidly supported by said frame and encircling said shaft, a second pipe telescoping on said first pipe, means for rigidly securing said pipes in their relatively adjusted positions, and a deflecting member carried at the lower end of said second or telescoping pipe and comprising a hollow cone, said second or telescoping pipe extending substantially to the base of said deflecting member and provided with an internal bearing of Babbitt or other suitable metal for journaling the lower end of said rotatable shaft, substantially as described.

22. In a distributing apparatus, the combination of a supporting frame, comprising a central portion and a plurality of radiating arms, clamps for securing the ends of said arms to a hatch coaming or similar support, said clamps consisting of a pair of clamping members connected by a transverse bar, and a set screw for securing said arms between said members of each clamping device, whereby any substantial lateral movement causes a pair of said divergent arms to bind against said clamping members, and means carried by said frame for distributing the material to be stowed, substantially as described.

In testimony whereof, I affix my signature, in presence of two witnesses.

GEORGE C. ELLERTON.

Witnesses:
MYRON G. CLEAR,
J. STEPHEN GIUSTA.